United States Patent
Gambini et al.

(10) Patent No.: US 6,775,343 B1
(45) Date of Patent: Aug. 10, 2004

(54) RECEIVER FOR SIGNALS IN A DISCONTINUOUS FLOW AND CORRESPONDING RECEIVING PROCESS

(75) Inventors: Piero Gambini, Turin (IT); Roberto Lano, Almese (IT); Libero Zucchelli, Turin (IT)

(73) Assignee: Agilent Technologies, Inc, Palo Alto, CA (US)

( * ) Notice: Subject to any disclaimer, the term of this patent is extended or adjusted under 35 U.S.C. 154(b) by 606 days.

(21) Appl. No.: 09/630,961

(22) Filed: Aug. 2, 2000

(30) Foreign Application Priority Data

Aug. 3, 1999 (IT) ........................................ TO99A0687

(51) Int. Cl.[7] ............................ H03D 3/24; H04J 14/02
(52) U.S. Cl. ...................................... 375/373; 359/193
(58) Field of Search ................................ 375/373, 354; 398/161, 212, 154–155

(56) References Cited

U.S. PATENT DOCUMENTS

| | | | | |
|---|---|---|---|---|
| 4,991,975 A | * | 2/1991 | Alferness et al. ............ | 398/98 |
| 5,124,669 A | * | 6/1992 | Palmer et al. ............... | 331/1 A |
| 5,208,693 A | * | 5/1993 | Arstein et al. ............... | 398/100 |
| 5,652,767 A | | 7/1997 | Kiyonaga et al. | |
| 5,710,649 A | * | 1/1998 | Mollenauer ................... | 398/75 |
| 5,831,752 A | * | 11/1998 | Cotter et al. .................. | 398/54 |
| 5,987,040 A | * | 11/1999 | Nesset et al. ................. | 372/8 |
| 6,069,720 A | * | 5/2000 | Cotter et al. .................. | 398/1 |
| 6,201,621 B1 | * | 3/2001 | Desurvire et al. ............ | 398/154 |
| 6,204,949 B1 | * | 3/2001 | Ishikawa et al. ............. | 398/159 |
| 6,307,869 B1 | * | 10/2001 | Pawelski ...................... | 370/516 |
| 6,362,911 B1 | * | 3/2002 | Lee et al. ..................... | 398/208 |
| 6,584,163 B1 | * | 6/2003 | Myers et al. ................ | 375/360 |

FOREIGN PATENT DOCUMENTS

| EP | 04022234 | 1/1992 |
|---|---|---|
| EP | 0629061 A1 | 5/1997 |
| EP | 0921654 A2 | 12/1998 |

OTHER PUBLICATIONS

Kamantani, Osamu; Kawanishi, Satoki, Ultrahigh–Speed Clock Recovery with Phase Lock Loop Based on Four–Wave Mixing in a Traveling–Wave Laser Diode Amplifier, Aug. 1996, Journal of Lightwave Technology, vol. 14, No. 8, pp. 1757–1767.*

* cited by examiner

*Primary Examiner*—Stephen Chin
*Assistant Examiner*—Lawrence Williams

(57) ABSTRACT

A receiver for optical signals arranged in packets of data having a discontinuous flow pre-reads the signal and generates, for each packet, a corresponding signal indicating the phase of the data in the packet, and a threshold level indicating the packet mean signal power. A delay line delays the discontinuous flow by a delay interval. A receiver responsive to the discontinuous flow delayed by the delay line performs, on each packet, a receiving operation on the basis of the threshold level and with a phase identified on the basis of the phase indicating signal.

18 Claims, 2 Drawing Sheets

RECEIVER FOR SIGNALS IN A DISCONTINUOUS FLOW AND CORRESPONDING RECEIVING PROCESS

The present invention tackles the problem of receiving signals in a discontinuous flow and with a high bit rate. This problem arises, for example, within the switching nodes of packet-switched optical networks.

A signal corresponding to a flow of data of the type described above is shown schematically in FIG. 1. Essentially, this is a flow of data at a high bit rate (fc), transmitted from a remote system along an optical fibre, for example, and intended to be received in a receiving device. The data flow in question is structured in packets with a duration of Tp, separated by "guard times", denoted by Tg, in which no data are transmitted. The time interval between the initial instants of two packets Pi, Pi+1, etc., received in succession is therefore denoted by the interval Ts, where Ts=Tp+Tg. If fc and Tp are known, then the number N of bits in the packet is also known: N=fc×Tp.

The problem of the reception of discontinuous data flows of the type specified above arises essentially from the fact that, even if the phase of the data in each packet does not vary significantly throughout the duration of the packet, the packets received in succession usually have phases which are completely uncorrelated with each other.

The object of the present invention is to provide a device capable of enabling data flows of the type described above to be received in a precise and reliable way.

According to the present invention, this object is achieved by means of a receiver having the characteristics called for in the following claims. The invention also relates to the corresponding process of reception.

Briefly, the solution according to the invention provides for the execution, at the time of reception of each packet, of a kind of "pre-reading" of at least part of the packet, with the purpose of acquiring the information relating to the phase (and, preferably, also the mean signal power) of each packet. The information thus acquired is then used for the execution of the actual reading operation.

Figure 1:
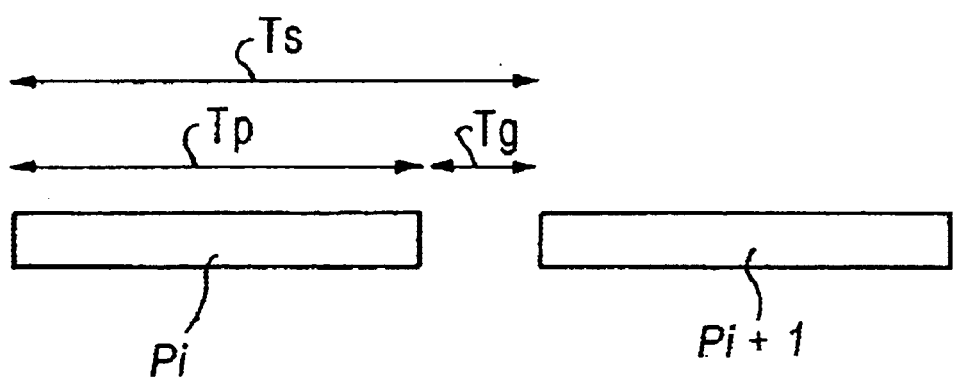
Figure 2:
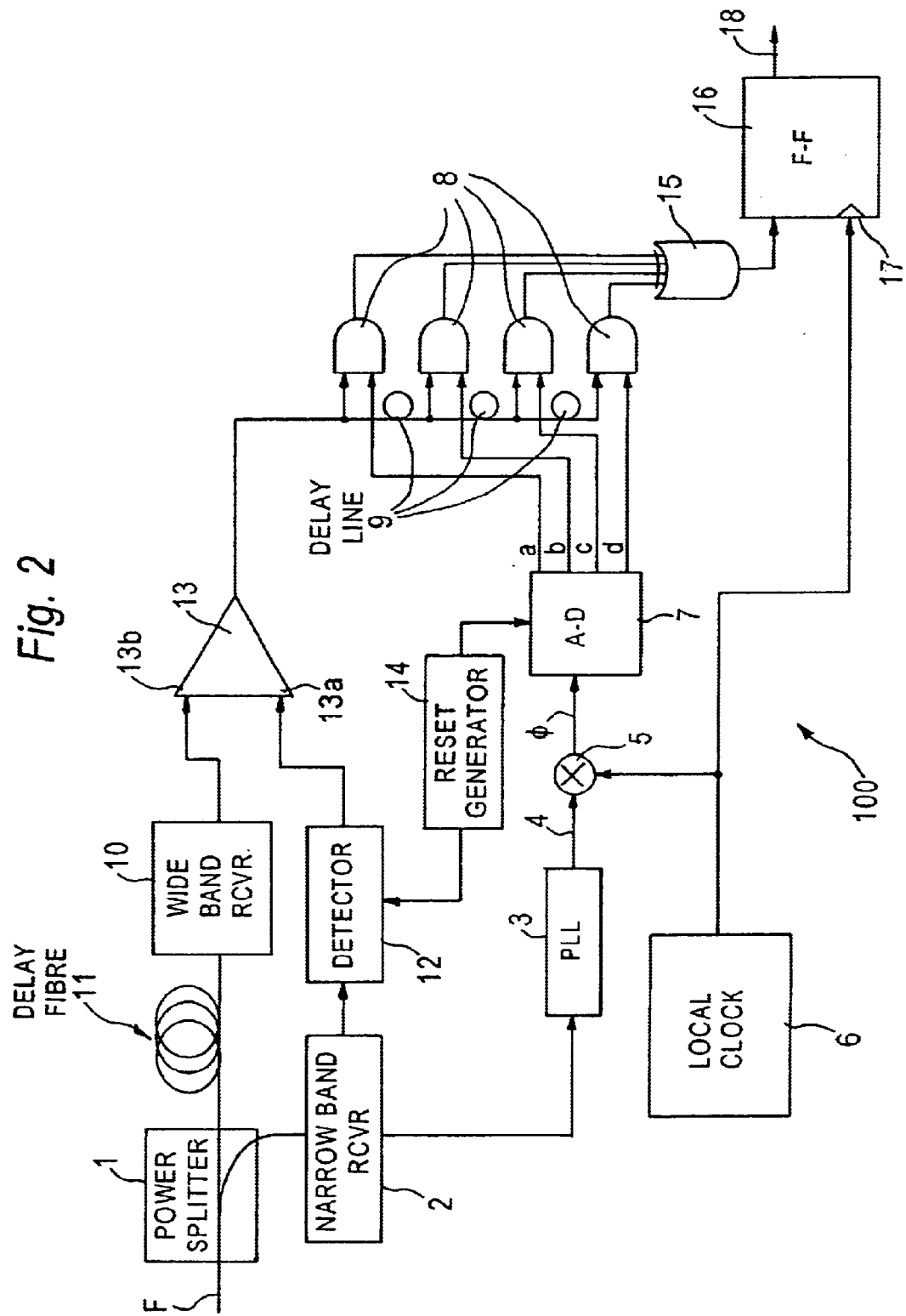

The invention will now be described, purely by way of example and without restrictive intent, with reference to the attached drawings, in which:

FIG. 1, relating to the identification of the field of application of the invention, has already been described above, and FIG. 2 shows, in the form of a block diagram, the possible application of the invention to an optical receiver.

A receiver according to the invention, indicated as a whole by the number 100, is shown here by way of example in the form of an optical receiver. This is, therefore, a device intended to receive an optical signal (having the characteristics described previously with reference to FIG. 1) from an optical fibre F.

An in-fibre power splitter 1 (of a known type), associated with the output end of the fibre F, diverts from the fibre a portion (for example 10%) of the transmitted signal and sends it to a narrow band receiver 2.

The term "narrow band receiver" here denotes in general an optical-electrical converter whose sensitivity curve is concentrated around a frequency value equal to a frequency ft equal to the (known) frequency of the clock which generates the packet in transmission.

The electrical signal leaving the receiver 2 is sent to a phase locked loop (abbreviated to PLL) circuit 3. After a settling time Ta following the start of each packet (the total Ta is generally shorter than Tp), the phase locked loop circuit 3 generates at a corresponding output 4 a signal whose phase is locked to the phase of the signal generated by the remote transmitter with the frequency ft, the identifier of the bit rate fc.

This signal is sent to a mixer 5 together with a signal generated at a frequency fr by a local clock 6. As explained more fully below, the values of ft and fr are identical or at least very close to each other, and therefore the output signal from the mixer 5 is (at least within each packet) proportional to the phase difference $\phi$ between the two signals brought to the input of the mixer 5.

The signal indicating the phase difference $\phi$ is then supplied to an analogue-digital converter 7 which generates, on corresponding output lines indicated by a, b, c and d, logical signals corresponding to the value of $\phi$. In particular, in the currently preferred embodiment of the invention, the aforesaid logical signals are generated—in a known way—according to the following table.

| Value of $\phi$ | a | b | c | d |
|---|---|---|---|---|
| $0° < \phi < 90°$ | 1 | 0 | 0 | 0 |
| $90° < \phi < 180°$ | 0 | 1 | 0 | 0 |
| $180° < \phi < 270°$ | 0 | 0 | 1 | 0 |
| $270° < \phi < 360°$ | 0 | 0 | 0 | 1 |

In practice, the one of the outputs a, b, c and d of the device 7 which has the logical value "1" (while all three of the other outputs have the logical value "0") identifies the quadrant in which the phase difference $\phi$ is located.

The use of an analogue-digital converter such as that indicated by 7 and/or a parallel configuration of the corresponding outputs is clearly only one of various possible selections which permit the implementation of the desired conversion function. Various alternative solutions (logical networks operating on a plurality of versions of the signal $\phi$ with phase differences between them, etc.) are well known to those skilled in the art, and do not require detailed illustration here.

The above is also true for the level of resolution of the conversion operation: this is because a more detailed conversion operation can be envisaged and is practicable from the technical point of view, and would have the aim of identifying the location of the phase difference $\phi$ not only within one of four quadrants (a resolution of 90°), but also, for example, within one of eight octants (a resolution of 45°), or within one of sixteen angular sectors corresponding to one sixteenth of a round angle, in other words 22.5°, and so on.

In general, if:
  ft denotes the frequency of the clock generating the packet,
  fr denotes the frequency of the local clock 6 of the receiver receiving the packet, and
  $\Delta f$ denotes the absolute difference $|ft-fr|$, the selection of the level of resolution is related to the requirement to satisfy the relation $kN < ft/\Delta f$, where
  N denotes the number of bits present in the packet and k represents the resolution factor in the detection of the value of the phase difference $\phi$: in the illustrated example, k is equal to 4. This is equivalent to the assumption that the frequencies ft and fr are "substantially close" to each other: this latter wording clearly includes the possibility that the two frequencies in question may be identical to each other.

However, the higher resolution and the greater precision which can be achieved by the selection of higher values of k (not necessarily limited to values which are equal to two or which are powers of two) will have the drawback of a greater complexity of the circuit resulting from the adoption of such a solution. This greater complexity also affects the set of parts indicated as a whole by 8 and 9, which are more fully described below.

Conversely, it is also possible to envisage a solution intended to provide greater simplicity of the circuit, and consequently having a discrimination of the value of the phase difference φ limited to two sectors each having an angular size of 180°. However, the simplification thus achieved will also have a drawback, in the form of a consequent lower operating precision.

However, trials conducted by the applicant up to the present time have demonstrated that the selection of a resolution in four quadrants (k=4) is preferable.

The components indicated as a whole by 8 consist of logical gates, their number being equal to the separate values which can be taken by the signal (lines a, b, c, d) emitted by the converter 7. In the illustrated example of an embodiment, therefore, there are four logical gates 8 of the AND type, each of which receives at one of its inputs the logical signal present on one of the output lines a, b, c and d of the converter 7.

Consequently, only one of the four gates 8 (identified by the value taken by the phase difference signal φ) is actually enabled and therefore capable of transferring to its output the signal received at the other input.

At this other input there is an electrical signal substantially equal to the electrical signal produced by the conversion (carried out in a wide band receiver device indicated by 10) of the "main" optical signal present in the fibre F after the splitter 1 has extracted the portion ("secondary" optical signal) sent to the narrow band receiver 2.

The main optical signal is propagated along a portion of fibre 11 of length L such that it introduces a delay τ into the main signal. The length L is chosen in such a way that τ is at least equal to, and therefore greater, than, both Ta (the settling time of the PLL 3 from the start of the packet) and a value Ti defining the settling time of a detector circuit 12.

The function of the detector circuit 12 (shown here as being designed to receive the output of the narrow band receiver 2 at its input, but actually capable of being integrated into the receiver 2 itself) is to generate and maintain throughout the duration of the packet a signal corresponding to the mean power value of the received signal. This has the purpose of permitting the fixing of the threshold of discrimination 13a of a comparator circuit 13 which receives, at 13b, the electrical signal deriving from the conversion, carried out in the receiver device 10, of the main optical signal delayed by its passage along the fibre 11.

The detector 12 is provided in order to enable the comparator circuit 13 to discriminate the values of the signal arriving from the receiver 10 according to an adaptive threshold related to the mean value of the signal within each packet. As stated above, the device essentially consists of a wide band receiver capable of carrying out a correct action of converting the main optical signal including the modulation component. In all of this it differs from the omologous device 2, which is essentially a narrow band receiver centred on the frequency at which the phase locking is to be carried out.

The reference 14 indicates a generator, of a known type, capable of generating (according to a command arriving from the exterior or generated, in a known way, in the device 100) a signal such that the detector 12 and the converter 7 are reset when the reception of a packet is complete, to prepare them for the reception of the next packet.

The output signal from the comparator 13 is then sent to the inputs of the logical gates 8 in a direct version (supplied to the first of the gates 8) and in the form of three replicas altered by incremental phase shifts or delays applied to the signal as it passes along delay lines 9, each of which applies to the signal brought to its input a delay equal to a quarter of the period Tc corresponding to the bit rate fc of the signal to be received. The signals brought to the input of the second, third and fourth logical gate 8 will therefore have delays of Tc/4, 2Tc/4 and 3Tc/4 respectively with respect to the aforesaid direct version.

The reference 15 indicates a further logical gate, shown here as a logical gate of the OR type, but capable of being constructed simply in the form of the configuration normally called "wired OR", designed to send the signals from the gates 8 to an output flip-flop 16.

The flip-flop 16 (which may, for example, be of the D type, clocked at an input 17 by the signal arriving from the local clock 6) receives at the input D the signal from the gate 15, subsequently restoring it—as the received signal—at its output 18.

As mentioned above, only one of the logical gates 8 (the one selected by the converter 7) receives a high logical level at its enabling input connected to one of the lines a, b, c, d. Thus only the selected gate 8 will have at its output, connected to the flip-flop 16, the signal corresponding to the main optical signal subjected to a delay which varies according to the logical gate which it has passed through and which therefore depends on the phase difference φ detected at the input of the converter 7.

It will be appreciated that it is possible, by a correct selection of the length of the fibre 11 and the subsequent propagation paths, to ensure that the received signal is always in phase (with a precision of Tc/4, or greater when a higher degree of discrimination is used in the converter 7 and in the set of logical gates 8) with the local clock 6, so that it can be sampled in an instant close to the maximum or minimum point, thus minimizing the error rate.

The main optical signal, converted into an electrical signal at 10 and subjected to the threshold process at 13 (according to the adaptive threshold value generated at 12) is finally read in the flip-flop 16. To carry out this reading operation correctly, the described solution provides for the generation of a certain number of versions (four in the illustrated example) of the aforesaid electrical signal, these versions being phase shifted by ordered fractions of the bit time Tc. This is done by means of the delay line 9. The phase information relating to the corresponding packet (previously found from the phase locking system comprising the elements 2, 3 and 5 and expressed by the logical values a, b, c, d present at the output of the converter 7) is used to enable the logical gate 8 which has at its input the version of the signal to be read, whose phase corresponds, with a precision of Tc/4, to the phase detected by the phase locking system by the "pre-reading" of the packet.

The described solution is therefore essentially based on the extraction (by the splitter 1) of part of the input optical signal which can be said to be subjected to pre-reading for the purpose of locking its phase (and preferably the mean power level). All of this takes place while the main optical signal, to be subjected to the actual receiving operation, is temporarily set aside, being made to pass along a delay line, so that it can be read subsequently, using the information on the phase (and on the mean power level) of the packet obtained in the meantime.

In other words, in the solution according to the invention, the operation of phase locking (and detection of the level) is separated from the actual receiving operation, which is delayed until the phase (and level) information is available. This makes it possible, in the case of discontinuous signals to which reference was made previously in relation to FIG. 1, to operate in conditions in which, while one data packet Pi, previously received and delayed in the fibre 11, is first read and then received in the set of elements indicated by 8, 9, 10, 13, 15 and 16, the phase (and the mean level) of the next packet Pi+1 is already being identified in the set of parts 2, 3, 5, 7 and 12. All this is done in order to proceed, on the basis of the information which is thus obtained, to the reception—carried out at a subsequent moment—of this new packet.

Clearly, provided that the principle of the invention is retained, the details of embodiment and the forms of application can be varied widely with respect to what has been described and illustrated, without thereby departing from the scope of the present invention. This is particularly true, for example, of the following aspects:

- the possibility of applying the same reception criteria to non-optical signals;
- the possibility of providing the differentiated propagation paths, identified in the illustrated example as components 8 and 9, upline rather than downline of the receiving operation carried out by the device 13, and/or
- the possibility of making these different propagation paths within a transmission medium whose propagation time is selectively variable, possibly in a continuous way.

What is claimed is:

1. A receiver for signals arranged in packets of data with a corresponding bit rate forming a discontinuous flow, comprising:
    a phase locking system adapted for carrying out, for each packet of the said discontinuous flow, a phase locking operation such that a corresponding phase signal, indicating the phase of the data contained in the packet, is generated within a given time interval,
    a receiving system comprising a delay line for delaying the said discontinuous flow by a delay interval which is at least equal to the said given time interval, together with a receiver element adapted for receiving the said discontinuous flow delayed by the said delay line and for carrying out, on the said each packet of the said discontinuous flow, a receiving operation with a phase identified on the basis of the said corresponding phase signal.

2. The receiver of claim 1, wherein the said phase locking system comprises:
    a narrow band receiver element arranged to be centered on the bit rate of the said signals and with an associated generator for generating, from the said signals, a corresponding bit rate signal,
    a local clock adapted for generating a corresponding local clock signal with a frequency substantially close to the said bit rate signal, and
    a phase comparator arranged to be sensitive to the said bit rate signal and to the said local clock signal and adapted for generating, from the said signals, the said corresponding phase signal.

3. The receiver of claim 2, comprising a phase locking circuit arranged to be sensitive to the output of the said narrow band receiver element and adapted to generate, from the said output, the said bit rate signal.

4. The receiver of claim 1, wherein the said delay line is an optical delay line.

5. The receiver of claim 1, also comprising a converter circuit arranged to be sensitive to the said corresponding phase signal and adapted for converting the said corresponding phase signal into a logical signal having separate values according to the value of the said corresponding phase signal.

6. The receiver of claim 1, wherein the said reception system comprises:
    propagation elements for forming different propagation paths for the said discontinuous flow, and
    a selection element for selecting the said different propagation paths according to the value of the said corresponding phase signal.

7. The receiver of claim 6, wherein the said propagation elements form a plurality of propagation paths having respective propagation times shifted with respect to each other by ordered fractions of the period corresponding to the said bit rate, the said propagation paths being arranged to be individually enabled by the said selection element.

8. The receiver of claim 1 wherein the said receiving system comprises a detector for detecting the mean signal value of each packet in the said discontinuous flow and said operation of receiving the said each packet being arranged to be carried out as a function of the mean signal value detected for the packet.

9. The receiver of claim 2 wherein the said receiving system comprises a detector for detecting the mean signal value of each packet in the said discontinuous flow and said operation of receiving the said each packet being arranged to be carried out as a function of the mean signal value detected for the packet, the said detector for detecting the mean value is associated with the said narrow band receiver element.

10. A process of receiving signals arranged in packets of data with a corresponding bit rate forming a discontinuous flow, characterized in that it comprises the operations of:
    carrying out, for each packet in the said discontinuous flow, a phase locking operation such that a corresponding phase signal, indicating the phase of the data contained in the packet, is generated within a given time interval,
    delaying the said discontinuous flow by a delay interval which is at least equal to the said given time interval, and
    receiving the said discontinuous flow by carrying out, on the said each packet of the said discontinuous flow, a receiving operation with a phase identified on the basis of the said corresponding phase signal.

11. The process of claim 10, wherein the said phase locking comprises the operations of:
    generating, from the said signals, a bit rate signal indicating the said corresponding bit rate,
    generating a corresponding local clock signal with a frequency substantially close to the said corresponding bit rate, and
    comparing the said bit rate signal and the said local clock signal, and generating, from the said signals, the said corresponding phase signal.

12. The process of claim 11, comprising the operation of subjecting the said signals to a narrow band receiving operation, generating a corresponding output signal, and carrying out the operation of generating the said bit rate signal with a phase locking operation on the said output signal.

13. The process of claim 10, comprising the operation of delaying the said discontinuous flow by using an optical delay line.

14. The process of claim 10, comprising the operation of converting the said corresponding phase signal into a logical signal with separate values according to the value of the said corresponding phase signal.

15. The process of claim 10 comprising the operations of:

forming different propagation paths for the said discontinuous flow, and selecting the said different propagation paths according to the value of the said corresponding phase signal.

16. The process of claim 15, comprising the operation of forming the said propagation paths with corresponding propagation times which are shifted with respect to each other by ordered fractions of the period corresponding to the said bit rate, and the operation of selecting the said propagation paths individually, according to the value of the said corresponding phase signal.

17. The process of claim 10, comprising the operations of:

detecting the mean signal value of each packet in the said discontinuous flow, and carrying out the said receiving operation on the said each packet as a function of the mean signal value detected for the packet.

18. The process of claim 12, comprising the operations of:

detecting the mean signal value of each packet in the said discontinuous flow, carrying out the said receiving operation on the said each packet as a function of the mean signal value detected for the packet, and detecting on the basis of the said corresponding output signal.

* * * * *